(12) United States Patent
Ribeiro, Jr.

(10) Patent No.: US 10,794,753 B2
(45) Date of Patent: Oct. 6, 2020

(54) WEIGHING PLATFORM FOR ANIMALS AND A PROCESS OF WEIGHTING AN ANIMAL WITH A WEIGHING PLATFORM

(71) Applicant: Robert Bosch Limitada, Campinas-SP (BR)

(72) Inventor: Luis Fernando L. Ribeiro, Jr., Campinas-SP (BR)

(73) Assignee: Robert Bosch Limitada, Campinas-SP (BR)

( * ) Notice: Subject to any disclaimer, the term of this patent is extended or adjusted under 35 U.S.C. 154(b) by 134 days.

(21) Appl. No.: 15/769,624

(22) PCT Filed: Oct. 18, 2016

(86) PCT No.: PCT/BR2016/050261
§ 371 (c)(1),
(2) Date: Apr. 19, 2018

(87) PCT Pub. No.: WO2017/066857
PCT Pub. Date: Apr. 27, 2017

(65) Prior Publication Data
US 2018/0313686 A1 Nov. 1, 2018

(30) Foreign Application Priority Data
Oct. 19, 2015 (BR) .............................. 102015026489

(51) Int. Cl.
*G01G 17/08* (2006.01)
*G01G 23/00* (2006.01)
(Continued)

(52) U.S. Cl.
CPC ........... *G01G 17/08* (2013.01); *G01G 23/005* (2013.01); *G01G 23/10* (2013.01); *G01P 15/0802* (2013.01)

(58) Field of Classification Search
CPC ...... G01G 17/08; G01G 23/005; G01G 23/10; G01P 15/0802
(Continued)

(56) References Cited

U.S. PATENT DOCUMENTS 4,278,139 A * 7/1981 Caris .................... G01G 23/005
177/154
4,711,314 A * 12/1987 Suzuki ................. G01G 3/1412
177/164
(Continued)

FOREIGN PATENT DOCUMENTS

| EP | 1985977 | 10/2008 |
| JP | 4309823 | 8/2009 |
| WO | 2005048699 | 6/2005 |

OTHER PUBLICATIONS

International Search Report and Written Opinion for Application No. PCT/BR2016/050261 dated Jan. 4, 2017 (9 pages).

*Primary Examiner* — Nimeshkumar D Patel
*Assistant Examiner* — Jean F Morello
(74) *Attorney, Agent, or Firm* — Michael Best & Friedrich LLP

(57) ABSTRACT

The present invention belongs to the technical field of animal weighing. The invention relates to an animal-weighing platform (1) comprising a plate (2) and at least one load cell (5). The platform (1) further includes: an accelerometer (9) fixed on said plate (2); and a processing unit (6) capable of identifying and processing the data provided by at least one load cell (5) and which includes a diagnostic module (14) capable of identifying and processing the data provided by said accelerometer (19). The present invention further relates to an animal-weighing process.

14 Claims, 2 Drawing Sheets

(51) Int. Cl.
*G01G 23/10* (2006.01)
*G01P 15/08* (2006.01)

(58) Field of Classification Search
USPC ............. 73/514.01, 1.13, 510, 862.627
See application file for complete search history.

(56) References Cited

U.S. PATENT DOCUMENTS

| | | | | |
|---|---|---|---|---|
| 4,901,575 | A * | 2/1990 | Bohannan | G01H 1/00 |
| | | | | 73/587 |
| 5,362,929 | A * | 11/1994 | Goto | G01G 3/13 |
| | | | | 177/210 FP |
| 5,442,146 | A * | 8/1995 | Bell | G01G 3/1412 |
| | | | | 177/210 FP |
| 6,331,682 | B1 * | 12/2001 | Hopkins | G01G 23/005 |
| | | | | 177/154 |
| 6,576,849 | B2 * | 6/2003 | Bliss | G01G 23/01 |
| | | | | 177/199 |
| 9,149,022 | B2 | 10/2015 | Triener | |
| 9,671,276 | B1 * | 6/2017 | Betts-Lacroix | G01G 21/28 |
| 2008/0264141 | A1 * | 10/2008 | Kenmochi | G01G 3/1414 |
| | | | | 73/1.08 |
| 2012/0299731 | A1 * | 11/2012 | Triener | G01G 17/08 |
| | | | | 340/573.1 |
| 2014/0332290 | A1 * | 11/2014 | Izumo | G01G 7/02 |
| | | | | 177/1 |
| 2015/0046120 | A1 * | 2/2015 | Sawano | G01G 19/44 |
| | | | | 702/173 |

* cited by examiner

WEIGHING PLATFORM FOR ANIMALS AND A PROCESS OF WEIGHTING AN ANIMAL WITH A WEIGHING PLATFORM

BACKGROUND OF THE INVENTION

The present invention relates to a device, or rather a platform, for optimizing the weighing of animals.

In several areas, including cattle ranching, there is a need to weigh animals frequently and accurately, and in large amounts, thus being necessary to use a robust, accurate and durable equipment.

Document WO2005/048699 discloses an animal-weighing platform system. These weighing platforms comprise a plate mounted on two weighing bars.

Document JP4309823 discloses an animal-weighing system including a weighing algorithm capable of interpreting the information provided by weighing sensors and calculating the animal's weight based on said information.

As seen in these prior-art systems, in case there is a failure in the weight measurement devices, especially due to damage, malfunctions or unevenness, the non-obtained data could compromise the integrity of the weighing data. Consequently, due to the lack of accuracy of the weighing of various animals, the managing of an entire herd is compromised, which can be extremely detrimental to decision-making and also cause financial losses due to the lack of an actual and accurate control.

SUMMARY OF THE INVENTION

The purpose of the present invention is to improve the known processes and devices.

In fact, the invention is related to an animal-weighing platform provided with a plate and at least one load cell. The weighing platform further includes: An accelerometer attached to said plate and a processing unit capable of identifying and processing the data provided by at least one load cell and which includes a diagnostic module capable of identifying and processing the data provided by said accelerometer.

A further object of the invention is an animal-weighing process with a weighing platform as defined above, the process comprising identifying and processing the data provided by at least one load cell. The process further comprises identifying and processing the data provided by an accelerometer and the step of emitting a warning if a failure in the weighing platform is detected based on accelerometer data.

The invention adds a new function to the traditional weighing platforms by means of a diagnostic module integrated with the elements responsible for the processing of weight data.

Data related to the behavior and condition of the platform may thus be integrated with the weight data for several new results, such as weighting the weight measurements related to the information provided by the diagnostic module or checking the consistency of weight data based on the data of an accelerometer or, still, emitting warnings according to accelerometer data.

The preferred characteristics which may complement the weighing platform according to the invention are indicated below. A weighing platform may include one of these characteristics or a number of these characteristics combined.

The accelerometer has acceleration measurement axis perpendicular to the plane of the plate.

The accelerometer has two additional acceleration measurement axes, one in the longitudinal direction of the plate and the other in the transverse direction of the plate.

The accelerometer is a center of inertia which further comprises at least one giroscope.

The weighing platform comprises two weighing bars located in the longitudinal end portions of the plate, wherein the load cell is mounted in each end of the weighing bars, i.e., four load cells 5 altogether, the accelerometer being located in the center of the plate.

The accelerometer is fixed inside a data center mounted below the plate.

At least one load cell is connected to the data center.

The data center comprises a scan module, in which at least one load cell and the accelerometer are connected, said scan module being able to scan the data of the at least one load cell and of the accelerometer.

The scan module comprises an output which provides the scanned data of at least one load cell and of the accelerometer together on a single serial line connected, wired or wireless, to the processing unit.

The processing unit is connected to a network access point.

The processing unit includes a diagnostic module programmed to output a warning if a failure in the weighing platform is detected by the accelerometer.

Said failure may be a failure in the structure of the plate, in the leveling of the plate, and/or a failure related to a damage of at least one load cell.

The diagnostic module is programmed to measure how frequently the animal passes over the plate.

The weighing platform includes a computer connected to a processing unit via a network.

BRIEF DESCRIPTION OF THE DRAWINGS

The invention is detailed below by the description of a preferred embodiment, illustrated by the figures, in which.

DETAILED DESCRIPTION

Figure 1:
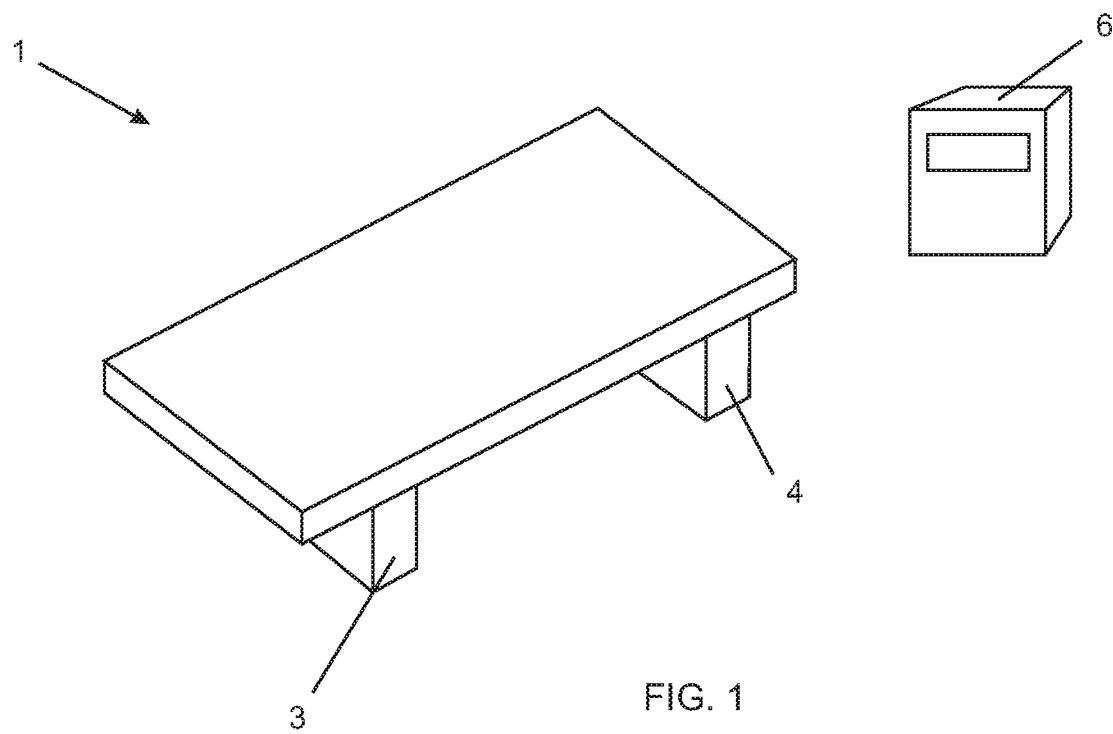
FIG. 1 is a top perspective view of a weighing platform according to the invention.

FIG. 1 shows in perspective a weighing platform 1 intended for weighing animals as, for example, in the cattle industry.

The weighing platform 1 meets the need of regularly weighing the animals bred. The weighing platform 1 may be installed in animal passageways for a dynamic weighing, or in a defined location for a static weighing, so that each animal is driven to weighing whenever necessary.

The weighing platform 1 includes a plate 2 able to support the animal to be weighed. The plate 2 is mounted on two weighing bars 3, 4, said weighing bars 3, 4 including, in this embodiment, each a load cell 5 (the load cells can be seen in FIG. 3).

The load cell 5 is a usual equipment, however, in the present embodiment of the invention it is capable of emitting an analog electrical signal proportional to the weight that is applied on it. When an animal is on the plate 2, its weight activates the load cells 5 of the weighing bars so that representative data of the animal's weight is obtained. It should be noted that the structure of the present embodiment comprises four load cells 5 and that the weighing platform can work with any number of load cells or any type of weighing sensor.

The weighing platform 1 also includes a processing unit 6 which can be equipped with a CPU (Central Processing Unit) capable of processing the representative data of the weight provided by the load cells 5. The processing unit 6 may comprise several ordinary characteristics such as a display for directly exhibiting the weight that is being measured or, also, a network connection for sending the weighing data to another remote device.

Figure 2:
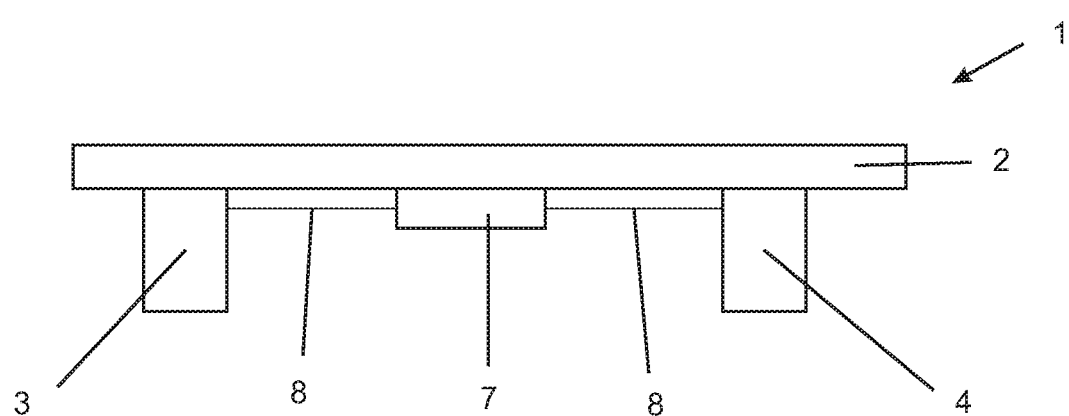
FIG. 2 is a side view of the weighing platform of FIG. 1.

As seen in FIG. 2, the weighing platform 1 further includes a data center 7 attached below the plate 2. The data center 7 is connected to each load cell 5 by electric cables 8 and communicates with the processing unity 6 by wire or wireless.

Figure 4:
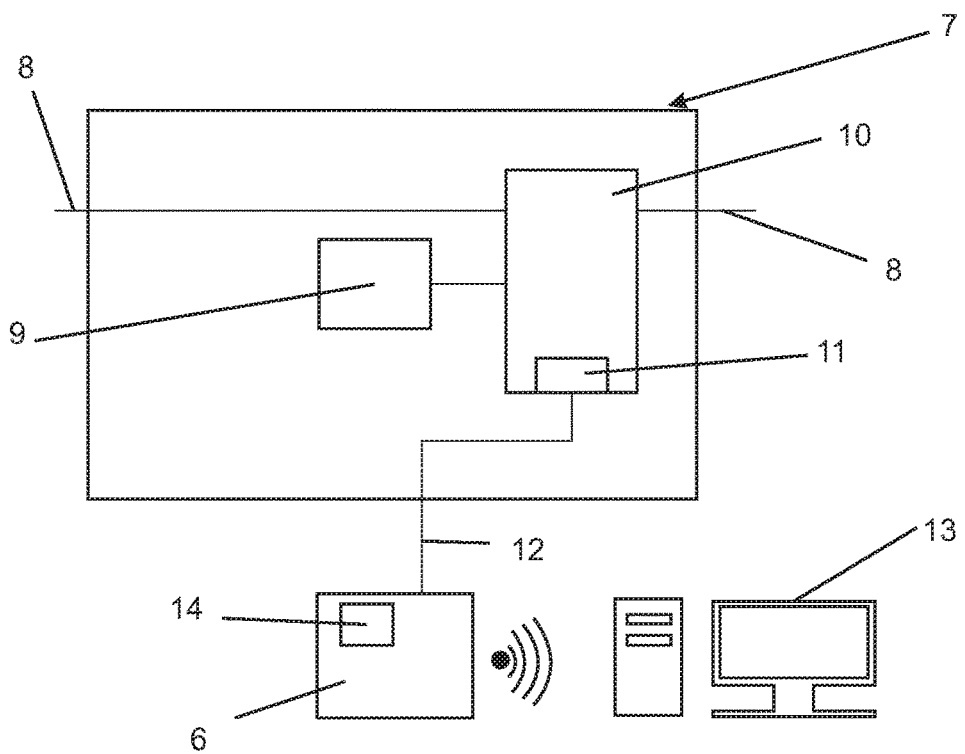
FIG. 4 illustrates schematically the data center of the weighing platform of FIG. 1.

FIG. 4 illustrates the content of the data center 7, which includes an accelerometer 9 and a scan module 10. The accelerometer 9 is rigidly fixed inside the data center 7 and the latter is rigidly fixed underneath the plate 2, so that every movement or vibration of the plate 2 is transmitted to the accelerometer 9. The data center 7 is preferably fixed in the center of the plate 2, and the accelerometer 9 is also preferably fixed in the center of the data center 7 between the weighing bars 3, 4, which are placed in the longitudinal end regions of the plate 2.

The accelerometer 9 preferably measures the acceleration of the plate 2 in the vertical direction, that is, in the direction perpendicular to the plane of the plate 2. The accelerometer 9 can also measure the linear acceleration relative to one, two or three orthogonal directions, such as, for example, an acceleration measurement axis in the direction perpendicular to the plane of the plate 2, the other in the longitudinal direction of the plate 2 and another in the transverse direction of the plate 2. The accelerometer 9 may further include one or several giroscopes capable of measuring the angular acceleration relative to one, two or three orthogonal axes.

In the present preferred embodiment, the accelerometer 9 is a center of inertia capable of measuring accelerations relative to the three translations and the three rotations according to an orthogonal base.

In terms of construction, the accelerometer 9 may be of any usual technology, such as: Piezoelectric, Piezoresistive, Capacitive, Hall effect, Magnetoresistive, optical, etc.

In the present embodiment, both the load cells 5 and the accelerometer 9 output analog signals. The load cells 5 and the accelerometer 9 are connected to the scan module 10 so that the scan module 10 receives said analog data.

The scan module 10 is an electronic circuit capable of converting an analog signal in digital signal. The scan module 10 emits in its output 11 a digital signal that travels in only one serial line 12 to the processing unit 6. To do so, in a first step, the scan module 10 scans the data of the load cells 5 and of the accelerometer 9 and, in a second step, the scan module 10 combines in serial line 12 the scanned data from the load cells 5 and the accelerometer 9.

Alternatively, the accelerometer 9 is a digital accelerometer that directly provides data in digital form. In this case, the structure of the data center 7 remains the same, with the load cells 5 and the accelerometer 9 connected to the scan module 10. However, in the first step, the scan module 10 scans only the analog data of the load cells 5 and, in the second step, directly uses the scanned data of the accelerometer 9 to combine them with the data from the load cells 5 which have just been scanned.

Figure 3:
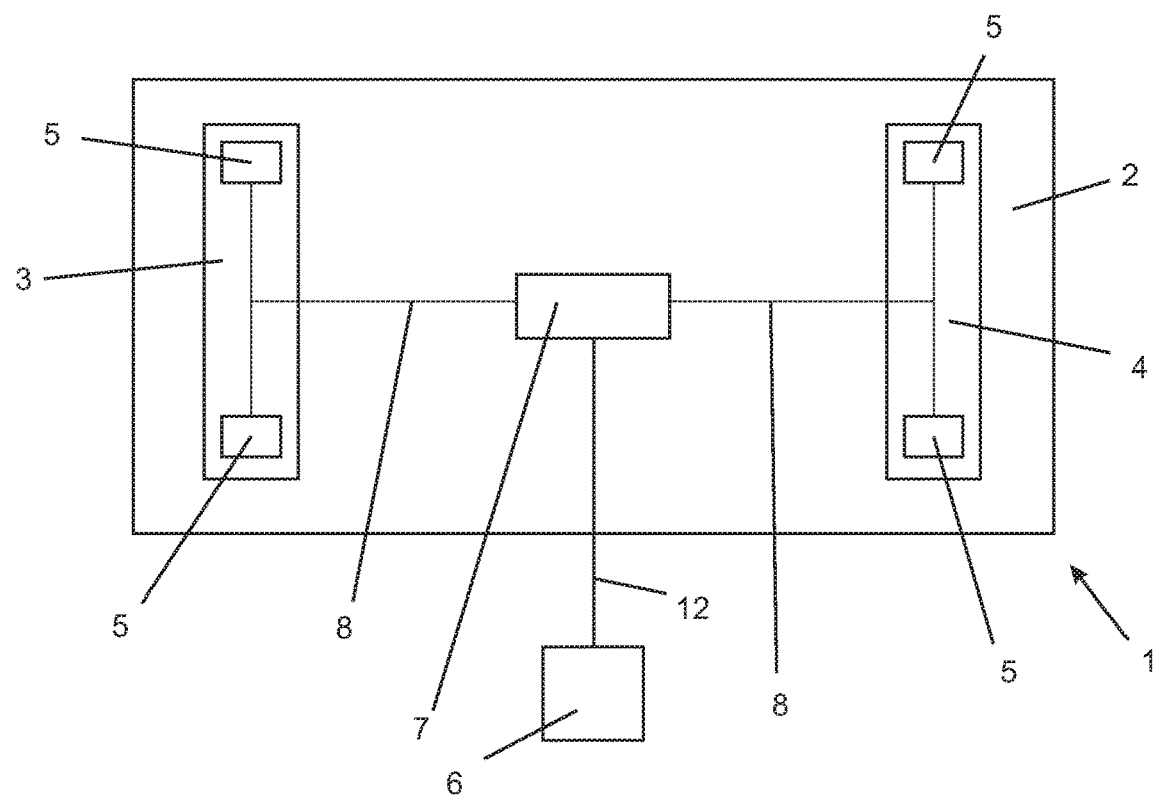
FIG. 3 is a bottom view of the weighing platform of FIG. 1.

The serial line 12 is the only connection between the data center 7 and the processing unit 6. It can be directly connected to the processing unit 6 (as shown in FIG. 3) or indirectly via a wireless connection.

In addition to the representative weight data, the processing unit 6 is capable of processing representative data from the accelerations of the plate 2, received from the accelerometer 9 and also provided by the serial line 12. The processing unit 6 includes a diagnostic module 14.

The processing unit 6 shall be installed close to the plate 2. If the data of the weighing platform 1 need to be remotely processed or exhibited in a location far from the plate 2, the weighing platform 1 may include a remote computer 13, wherein the connection between the processing unit 6 and the computer 13 occurs via any type of network, preferably wireless. The processing unit 6 may be connected to a network access point and the computer may also be connected to said network.

In turn, the weighing platform 1 works as indicated below.

An animal is placed over the plate 2 of the weighing platform 1 to be weighed. The load cells 5 of the weighing bars 3, 4 capture the weight and communicate the information by cable 8 to the scan module 10. Simultaneously, the accelerometer 9 captures the accelerations and the movements of the plate 2 and communicates the information to the scan module 10.

The scan module 10 scans the data and the combination on the serial line 12 of said data that had just been scanned.

The serial line 12 forwards the data to the processing unit 6, which processes said data.

After that, the processing unit 6 identifies the data provided by the load cells 5 and executes a weighing algorithm so as to calculate the animal's weight. Simultaneously, the processing unit identifies and processes via the diagnostic module 14 the data provided by the accelerometer 9.

Based on the data of the accelerometer 9, the diagnostic module is capable of providing additional information to complement the weight measurement.

According to one embodiment, the diagnostic module 14 is capable of detecting a failure in the plate 2 of the weighing platform 1.

For example, the plate 2 may have a failure in the structure. If the plate 2 is weakened or broken, the weight measurement by the load cells 5 is distorted because the weight is abnormally distributed over them. If in an extreme case the plate 2 is damaged, the weight measurement might not even occur. In order to detect a failure in the structure of the plate 2, the diagnostic module 14 has the standard vibratory behavior of the plate 2. The standard vibratory behavior of the plate 2 can be previously memorized by means of the data provided by the accelerometer 9 during a moment where the plate 2 was functional or, for example, by means of a preprogrammed intern memory. The diagnostic module 14 compares the current vibratory behavior of the accelerometer 9 with the standard vibratory behavior that is memorized. In case of discrepancies, the diagnostic module concludes that the plate 2 has a failure in the structure.

Another example of failure that the diagnostic module 14 can detect in the weighing platform 1 is related to possible damages to the load cells 5. The load cells 5 are, in general, sensitive elements which poorly support shocks. The data provided by the accelerometer 9 allow the diagnostic module 14 to monitor the condition of the load cells 5 and to detect a critical situation, in which at least one load cell 5 stopped working. For this purpose, the diagnostic module 14 memorizes the amount of shocks captured in the plate 2, a shock being, namely, an acceleration above a given threshold. The weighing platform 1 is useful to weight animals that may be of considerable size and weight, and may be also subjected to destructive kicks or moves. The diagnostic module 14 may, therefore, be programmed to detect a failure when the accelerometer 9 measures several accelerations of the plate 2, each of them above a critical value for the load cells.

The diagnostic module 14 can also detect a failure related to the unevenness or poor positioning of the plate 2 in relation to the load cells 5, captured by the accelerometer 9.

No matter the failure detected, the diagnostic module 14 emits a warning to the operator of the weighing platform 1. The warning can be a visual or audible signal in the processing unity 6, and is preferably sent to the computer 13.

For example: In the case a failure in the structure, an unevenness or a poor positioning of the plate 2 is detected, the computer 13 may display an error in its screen warning the operator that the weight measurements are compromised and that it is necessary that a technician checks the weighing platform.

In the case a failure related to a damage in the load cells 5, the computer 13 may display a warning in its screen warning that an animal is possibly agitated and that it will be necessary to check or replace the load cells 5.

Said warnings in the computer 13 are particularly adapted to each case, as for example, in the case of a large farm where the weighing platforms 1 are installed in remote places, so that the animals are weighed far from the farmhouse where the computer is normally installed. The data transmission between the processing unit 6 and the computer 13 allows to remotely monitor the weighing platforms 1 and also prevents unnecessary maintenance inspections. The maintenance inspections can be spaced apart, considering that the user of the computer 13 starts a maintenance intervention as soon as a warning is communicated to him.

The diagnostic module 14 can also provide data related to the animal's behavior on the weighing platform 1. It can, for example, process the data from the accelerometer 9 in order to determine how frequently the animal passes over the plate 2 and transmit said information to the computer 13.

Since an example of a preferred embodiment has been described, it must be understood that the scope of the present invention comprises other possible variations, being limited only by the content of the appended claims, therein included possible equivalents.

The invention claimed is:

1. A weighing platform (1) for animals comprising a plate (2) and at least one load cell (5), characterized in that the weighing platform further includes: an accelerometer (9) fixed on said plate (2); and a processing unit (6) capable of identifying and processing the data provided by the at least one load cell (5) and which includes a diagnostic module (14) capable of identifying and processing data provided by said accelerometer (9), wherein the diagnostic module (14) is programmed to emit a warning in case a failure in the weighing platform (1) is detected by the accelerometer (9), wherein the failure is a failure in the structure of the plate (2);

wherein the weighing platform comprises two weighing bars (3,4) located at longitudinal end regions of the plate (2), having a load cell (5) mounted on each end of the weighing bars (3,4), the accelerometer (9) being located in the center of the plate (2).

2. A weighing platform (1) according to claim 1, characterized in that the accelerometer (9) has an acceleration measurement axis perpendicular to a plane of the plate (2).

3. A weighing platform (1) according to claim 2, characterized in that the accelerometer has two additional acceleration measurement axes, one in a longitudinal direction of the plate (2) and the other in a transverse direction of the plate (2).

4. A weighing platform (1) according to claim 3, characterized in that the accelerometer (9) is a center of inertia that further comprises at least one giroscope.

5. A weighing platform (1) according to claim 1, characterized in that the accelerometer (9) is fixed inside a data center (7) mounted underneath the plate (2).

6. A weighing platform (1) according to claim 5, characterized in that the at least one load cell (5) is connected to the data center (7).

7. A weighing platform (1) according to claim 6, characterized in that the data center (7) comprises a scan module (10), in which are connected at least a load cell (5) and the accelerometer (9), the scan module being able to scan the data of at least one load cell (5) and of the accelerometer (9).

8. A weighing platform (1) according to claim 7, characterized in that the scan module (10) comprises an output (11) which makes the data scanned by the at least one load cell (5) and of the accelerometer (9) available together in a single serial line (12) connected, wired or wireless, to the processing unit (6).

9. A weighing platform (1) according to claim 1, characterized in that the processing unit (6) is connected to a network access point.

10. A weighing platform (1) according to claim 1, characterized in that the diagnostic module can further detect a leveling failure of the plate (2) based on data provided by the accelerometer (9).

11. A weighing platform (1) according to claim 1, characterized in that the diagnostic module can further detect a failure related to a damage in the at least one load cell (5) based on data provided by the accelerometer (9).

12. A weighing platform (1) according to claim 1, characterized in that the diagnostic module (14) is programmed to measure how frequently the animal passes over the plate (2).

13. A weighing platform (1) according to claim 1, characterized in that the weighing platform includes a computer (13) connected to the processing unit (6) via a network.

14. Process of weighting an animal with a weighing platform (1) as defined in claim 1, the process comprising identifying and processing the data provided by at least one load cell (5), characterized in that the process further comprises identifying and processing the data provided by the accelerometer (9) and comprising the step of emitting a warning in case a failure in the weighing platform (1) is detected, based on the data from the accelerometer (9).

* * * * *